United States Patent [19]
Alpert

[11] Patent Number: 5,671,435
[45] Date of Patent: Sep. 23, 1997

[54] TECHNIQUE FOR SOFTWARE TO IDENTIFY FEATURES IMPLEMENTED IN A PROCESSOR

[75] Inventor: Donald Alpert, Santa Clara, Calif.

[73] Assignee: Intel Corporation, Santa Clara, Calif.

[21] Appl. No.: 496,259

[22] Filed: Jun. 28, 1995

Related U.S. Application Data

[63] Continuation-in-part of Ser. No. 938,288, Aug. 31, 1992.

[51] Int. Cl.$^6$ .............................. G06F 11/30; G06F 12/06
[52] U.S. Cl. .................... 395/800; 395/182.13; 395/311; 395/500; 364/DIG. 1; 364/DIG. 2
[58] Field of Search ...................... 395/800, 768, 395/490, 456, 500, 677, 284, 652, 186, 182.08, 311, 183.06, 183.14, 527, 185.06, 307, 430, 379, 899, 559, 182.13; 364/DIG. 1, DIG. 2, 514 C; 380/4

[56] References Cited

U.S. PATENT DOCUMENTS

| | | | |
|---|---|---|---|
| 4,779,188 | 10/1988 | Gum et al. | 395/500 |
| 4,866,769 | 9/1989 | Karp | 380/4 |
| 4,930,065 | 5/1990 | McLagan et al. | 395/870 |
| 4,967,345 | 10/1990 | Freidin | 364/514 C |
| 4,970,640 | 11/1990 | Beardsley et al. | 395/284 |
| 5,113,518 | 5/1992 | Durst, Jr. et al. | 395/186 |
| 5,121,486 | 6/1992 | Kurihara et al. | 395/311 |
| 5,144,551 | 9/1992 | Cepulis | 395/490 |
| 5,163,145 | 11/1992 | Parks | 395/500 |
| 5,408,611 | 4/1995 | Kim | 395/500 |
| 5,499,342 | 3/1996 | Kurihara et al. | 395/200.12 |

FOREIGN PATENT DOCUMENTS

| | | |
|---|---|---|
| 351961A2 | 8/1993 | European Pat. Off. |
| 313848B1 | 8/1994 | European Pat. Off. |

OTHER PUBLICATIONS

*Pentium™ Family User's Manual vol. 3: Architecture and Programming Manual*, pp. 25–74, 25–75 Intel, 1994.

*Primary Examiner*—Daniel H. Pan
*Attorney, Agent, or Firm*—Blakley, Sokoloff, Taylor & Zafman

[57] ABSTRACT

A specialized set of read-only identification (ID) registers are used to store information relating to a microprocessor and its associated attributes, so that microcode is not needed to sequence through steps to obtain such processor identification. A software access a base ID (or identifier) register which includes family (type), model and step ID for the processor, as well as the number of "name" and "feature" registers present for conveying additional information pertaining to these attributes.

20 Claims, 2 Drawing Sheets

TECHNIQUE FOR SOFTWARE TO IDENTIFY FEATURES IMPLEMENTED IN A PROCESSOR

This is a continuation-in-part (C.I.P.) application of Ser. No. 07/938,288; filed Aug. 31, 1992; and entitled "Apparatus And Method For Identifying A Computer Microprocessor," which application is incorporated by reference herein.

BACKGROUND OF THE INVENTION

1. Field of the Invention

The present invention relates to the field of microprocessors and, more particularly, to a scheme for identifying a microprocessor and its associated attributes.

2. Prior Art

In using a computer system it is advantageous to identify the particular microprocessor being utilized in the computer. This is especially true where there are a number of vendors providing compatible or "clone" processors. It is possible for some programs to function properly with a given processor from one manufacturer but may not be fully compatible with processors from other manufacturers. This difference may be due to a distinguishing difference in design or it could be due to an inherent "bug" in a given processor. In any event, identifying the manufacturer of the processor, as well as the type of the processor, allows certain actions to be performed based on the identification.

For example, a variety of different microprocessors have been designed and manufactured by Intel Corporation. The 80386, 80486 and Pentium™ processors are examples of microprocessors which are part of the x86 group of processors manufactured by Intel Corporation. In order to maintain compatibility, it is desirable that software be capable of operating with the different processors in the x86 group. Since newer generation processors, such as the Pentium™ processor, have features which are new or enhanced, it is necessary for the software to identify which features are present. Thus, by identifying the processor being utilized in the computer, the software is capable of responding with program routines which are operative with that particular processor.

Additionally, even with a given type of processor, such as the Pentium™ processor, some of the design elements may be different. For example, a processor type may have different versions (or models) based on improved designs, such as faster clock speed. It may also have design differences depending on where it was manufactured or the particular manufacturing process utilized (such as using a 0.35 micron design rule versus a 0.5 micron design rule). Furthermore, as "bugs" are discovered, "fixes" are implemented in the design to correct the problem. Thus, there are sub-categories of a particular processor type which are significantly different, requiring the software to respond differently as well. In many instances where a software may operate properly with one version of the processor, an error is generated with another version of the processor, even though the processor type is the same. Thus, it is advantageous and, in many instances critical, for the software to be able to identify the processor and attributes of that processor, in order for the software to operate optimally without errors or "crashes."

The Pentium™ processor implemented an identification scheme which is generally disclosed in the afore-mentioned U.S. patent application entitled "Apparatus And Method For Identifying A Computer Microprocessor;" Ser. No. 07/938, 288; filed Aug. 31, 1992, and in another Continuation-In-Part application entitled "Apparatus And Method For Identifying The Features And The Origin Of A Computer Microprocessor;" Ser. No. 08/023,916; filed Feb. 26, 1993, which is also incorporated by reference herein. These applications describe a technique of identifying a given microprocessor type as well as certain attributes of that processor. However, the techniques described in these applications require the use of the system microcode, since complex instructions are utilized to manipulate feature identifying information. For example, the use of a CPUID instruction in the Pentium™ processor for one requires such microcode usage. It would be advantageous to implement a processor identifying scheme without the use of microcode in order to provide a simpler and faster architecture. Where desired, it would also be advantageous to provide both techniques, in order to permit older software programs utilizing the opcode scheme to be compatible with processors implementing the newer non-opcode scheme.

SUMMARY OF THE INVENTION

The present invention describes a technique for identifying a microprocessor and its associated attributes with the usage of microcode to sequence through steps to obtain such processor identification. A specialized set of read-only identification (ID) registers are used to store information relating to the processor. A software access a base ID (or identifier) register which includes family (type), model and step ID for the processor. Two numbers are also stored in the base register.

The first number provides the number of registers allocated in the ID registers for storing "name" information for the processor. The second number provides the number of registers in the ID registers for storing "feature" information for the processor. Thus, once software access the base register, the software will know how many registers it needs to access to obtain the "name" and "feature" information. Accordingly, this flexibility allows few or many registers to be allocated for conveying processor information.

Economic Advantage: The scheme for providing processor identification without using microcode allows for simpler instructions and simpler architecture to be used for enhanced performance, which ultimately results in cost-savings for the processor. Enhanced performance is also obtained from increased speed or overlap in execution when microcode is not used.

DETAILED DESCRIPTION OF THE PREFERRED EMBODIMENT

A technique for software to identify features implemented in a processor without the use of computer microcode to implement sequences for identifying the processor is described. In the following description, numerous specific details are set forth, such as specific devices, techniques, features and bit-length for implementation, etc., in order to provide a thorough understanding of the present invention. However, it will be obvious to one skilled in the art that the present invention may be practiced without these specific details. In other instances, well known techniques and structures have not been described in detail in order not to unnecessarily obscure the present invention. It is to be noted that a preferred embodiment of the present invention is described. However, it is readily understood that other embodiments can be designed and implemented without departing from the spirit and scope of the present invention. Furthermore, it is appreciated that the present invention is described in reference to a microprocessor utilized in a computer system. However, it is understood that the present invention can be utilized in other processors and processing devices as well, without departing from the spirit and scope of the present invention.

Figure 1:
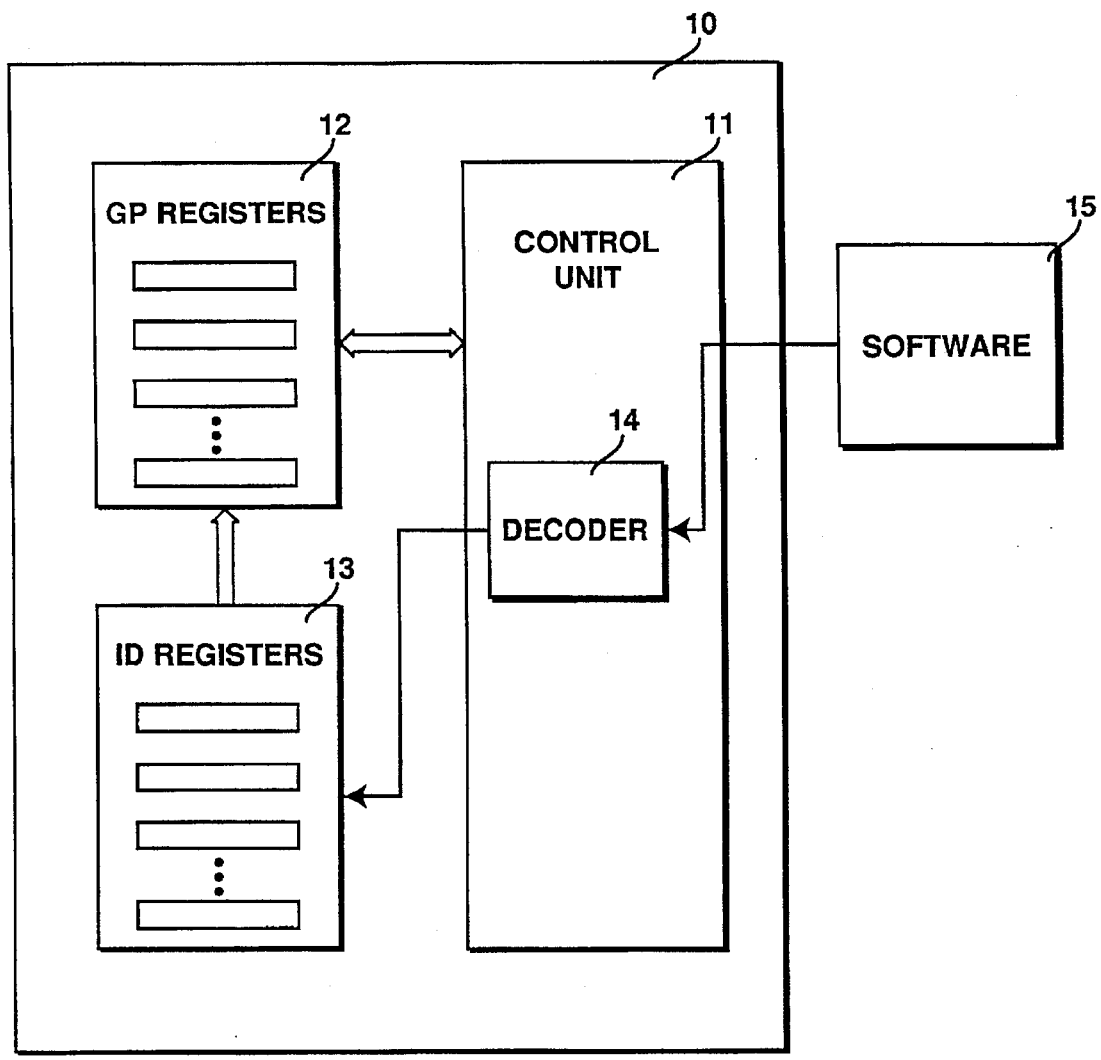
FIG. 1 is a schematic block diagram of a processor of the present invention in which software accesses specialized identification (ID) registers that store information related to the identification of the processor.

Referring to FIG. 1, a microprocessor 10 which implements a processor identifying scheme of the present invention is shown. Generally, microprocessor 10 is utilized as a (or one of several) central processing unit(s) of a computer system. It is to be noted that how the processor 10 is used is not central to the understanding of the present invention. Within processor 10 resides a control unit 11, a plurality of general purpose registers 12 and a plurality of special processor identification (ID) registers 13. The control unit 11, which includes a decoder 14 is responsible for generating control signals for the operation of processor 10. The decoder 14 is a hardware circuitry utilized to decode instructions received by the control unit 11. Generally such instructions emanate from software routines that are written to operate with processor 10. The design and implementation of control unit 11 and decoder 14 for decoding and executing computer instructions are generally known in the art.

The use of general purpose registers 12 within a given microprocessor architecture is also well-known in the art. The use of general purpose registers, such as registers 12, to manipulate information and facilitate information transfer for processor 10 are also known in the art. It is to be appreciated that there are substantial amount of other circuitry and functional units within processor 10, but are not shown in FIG. 1 since those elements are not relevant to the understanding of the present invention. Many of these features are also described in the aforementioned patent applications.

The ID registers 13 are for the purpose of implementing the present invention. The registers 13 are comprised of a plurality of individual registers, which number and purpose are defined below in this description. The ID registers 13 are coupled to the control unit 11 for receiving control signals for accessing registers 13. Specifically, the decoder 14 decodes instructions which access the registers 13 and read the contents of one or more of the ID registers 13. In the preferred embodiment, ID registers 13 are read-only registers, so that information stored in registers 13 can be read only. No new information can be written to registers 13.

When a particular register 13 is accessed by decoder 14, the contents of that register 13 are transferred to one of the general purpose registers 12. Once the contents are transferred to the general purpose register 12, the data can be processed or manipulated as desired. Generally, the manipulation is under control of software 15 written to operate with processor 10. Thus, it is understood then that the software 15 can generate an instruction which is decoded by the decoder 14 of control unit 11. One such instruction can designate one (or more) ID register(s) 13 as source register(s) and one (or more) general purpose register(s) 12 as destination register (s), so that contents of ID register(s) 13 can be "read" into general purpose register(s) 12. Because the ID registers 13 are read-only registers, the information contained in registers 13 are fixed once initially programmed. Furthermore, it is understood that information once transferred to the general purpose registers 12 are available for processing by software 15.

In the practice of the present invention, data representing the identification of the processor 10 and its various attributes are stored in the ID registers 13. When the processor 10 is manufactured, the corresponding processor information is programmed into ID registers 13. Later, when the processor is being used, software 15 can generate a simple instruction to access registers 13 to retrieve information that identifies the processor 10 and its attributes. No microcode is required to run a complex sequence of data manipulation to retrieve the contents of registers 13.

In the practice of the present invention, the actual number of ID registers 13 used is a design choice. However, with the preferred implementation there am constraints dependent on what information is to be presented and how many bits are to be utilized for that information. Also with the preferred embodiment, the ID registers are designed with the requirement that the registers 13 will operate within a 64-bit processor architecture. Thus, each of the registers 13 are 64 bits in length. Again, the bit-length of registers 13 is a design choice and will generally depend on the system architecture. The registers 13 could be readily extended to 128 bits if operating in a 128-bit environment. Correspondingly, each of the general purpose registers 12 are also of 64-bit in lengths.

Figure 2:
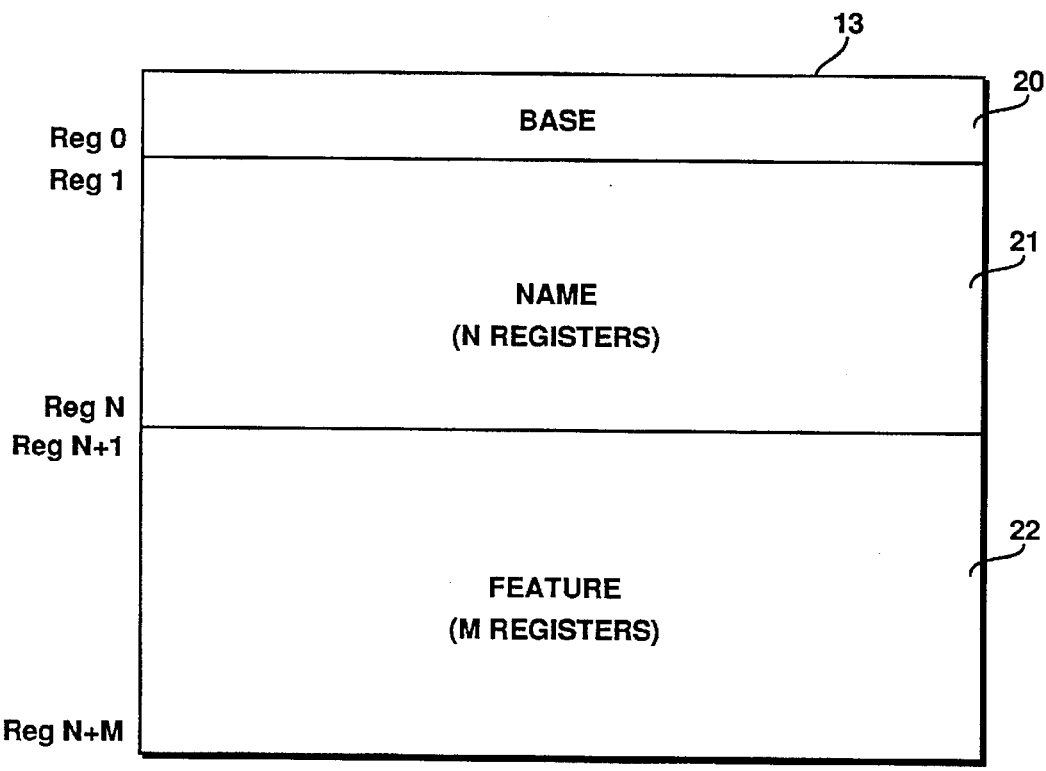
FIG. 2 is an illustration showing the allocation of a base, name and feature registers that form the ID registers of the present invention.

Referring to FIG. 2, a structure for the ID registers 13 is illustrated. The actual number of ID registers 13 present is a design choice and the total sum is designated by a number N+M+1. The very first register (Register 0) is a base register 20 and is also referred to as an identifier register. This base register 20 contains the basic information content identifying the processor 10. Subsequent to the base register 20 are a plurality of name registers 21. The number of name registers 21 present is a design choice and the actual number is designated as N. Thus, registers 21 are designated Register 1 through Register N. Following the name registers 21 are a plurality of feature registers 22. Again, the number of registers 22 present is a design choice and the actual number is designated as M. Thus, Registers N+1 through Register N+M form the feature registers 22. Accordingly, including the base register 20, there are a total of N+M+1 registers 13.

Figure 3:
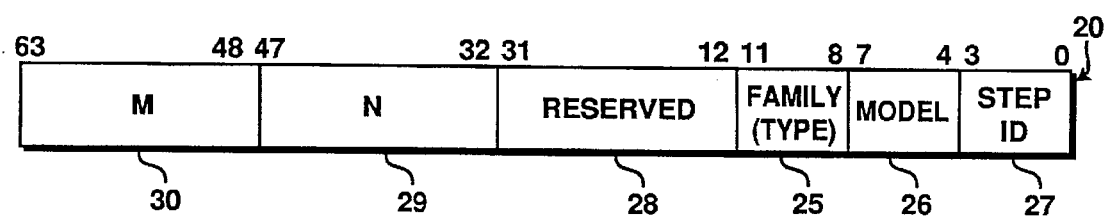
FIG. 3 is an illustration showing the allocation of bits in the base register for the purpose of conveying initial identifier information to the software in the practice of the preferred embodiment.

Also referring to FIG. 3, the bit assignments for the 64-bit data stored in the base register 20 of the preferred embodiment is illustrated. Bits 8:11 (read as bits 8 through 11, inclusive), noted by reference 25, are used to designated a processor family of the processor 10. A family designation is used to identify a processor type which function under a set architecture. For example, with microprocessors manufactured by Intel Corporation, 80386, 80486 and Pentium™ processors each distinguish a processor family. Therefore, bits 8:11 would be used to distinguish these processor types.

Bits 4:7 (reference 26) are used to designate a particular model within a family. The model designation is used to identify a major difference within a family. Again using the microprocessors of Intel Corporation, such model designations would be SX™, DX™, and DX2™. These particular designations identify the presence (or absence) of a floating point unit and clock speed doubling.

Bits 0:3 (reference 27) are used to designate a "step identifier (step ID)" which identifies the particular process or manufacturing step or steps used to fabricate the processor. As earlier noted, step IDs are used to note changes made to a design when "bug fixes" are implemented.

The three identifiers noted by bits 0:11 are also described in the aforementioned two applications. Bits 12:31 (reference 28) are reserved and not utilized. These bits can be used in the future to designate other attributes of the processor 10 as desired or required.

Bits 32:47 (reference 29) are used to identify the number of registers designated as the name registers 21. The number represented by bits 32:47 corresponds to the number N, which signifies the number of registers allocated as registers 21. Since there are sixteen bits allocated for identifying N, there can be up to $2^{16}-1$ name registers 21.

Bits 48:63 (reference 30) are used to identify the number of registers designated as the feature registers 22. The number represented by bits 48:63 corresponds to the number M, which signifies the number of registers allocated as registers 22. Again, since there are sixteen bits allocated for identifying M, there can be up to $2^{16}-1$ feature registers 22.

Thus, at the time a given processor is fabricated, values for M and N are fixed, since it is known how many registers are allocated for the name registers 21 and feature registers 22. The family, model and step ID information is also known. The information is then fixed (stored) in the base register 20 (Register 0). Similarly, other information are stored in registers 21 and 22, as well.

The name registers 21 are so designated due to the nature of the information stored in them. The binary information stored in the name registers 21 are utilized to generate letters, words, pictures, and other visual, video and audio stimulation pertaining to the identity of the processor. For example, the word "Genuine Intel" is one response generated to identify the processor. Various responses are available from the information stored in the name registers 21 to a software query. In most instances, the information in the name registers 21 are used to generate a certain stimuli response for the human user of the computer system. In the above example "Genuine Intel" can be placed on the monitor screen or it can be an audio signal spoken through a speaker for those computer systems so equipped with such audio (or multimedia) capability. Furthermore, in reference to the afore-mentioned C.I.P. application, the information contained in the indicia string stored in memory as described in that application can now be stored within the name registers 21 of the present invention.

The feature registers 22 are so named due to the nature of the information stored in them. The various features implemented in the processor are represented in some representative form in the feature registers 22. The contents of registers 22 can be utilized in various forms as desired, including the use of one (or more) bit(s) as a flag. The simplest format is to assign a particular bit as a flag to designate the presence (or absence) of a particular feature. Thus, bit state "0" can designate the absence of a feature, while bit state "1" can designate the presence of that feature. As a simplistic example, the following example is to be noted. Five separate flags are provided to designate the presence of five processor features. These features are:

1. The presence of a floating point unit capable of operating in the 80-bit extended precision floating point format.
2. The presence of a floating point unit capable of operating in a 128-bit floating point format.
3. The presence of multimedia instruction set in the architecture of the processor to respond to multimedia commands.
4. The presence of compatible architecture to provide x86 (80386, 80486 and Pentium™ processor) compatibility to run software written for the x86-based processors.
5. The presence of capability to provide machine check exceptions. That is, when hardware error is detected, it is reported to software which provides the routines for recovery from the hardware error.

As noted, these are just examples of different processor features which can be categorized and represented by flag bits in the feature registers 22. Again, one bit or multiple bits can be used to identify a given feature. Since there can be a substantial number of feature registers 22, the information which can be stored and the manner in which that information is organized is a design choice.

In operation, when a given software 15 wants to query the identity of processor 10, the software generates an instruction to read the contents of the base register 20. The instruction is decoded by the decoder 14 of control unit 11 and control signals are generated to load contents of the base register 20 (Register 0) into a designated general purpose register 12. The software looks at bits 0:25 to identify the family (type), model and step ID of the processor 10. The software also looks at the bits 32:63 to identify how many registers are allocated to the name registers 21 and feature registers 22. Depending on the values of M and N, the software can then generate instructions to load the contents of either or both of the two sets of registers 21 and 22. If only one general purpose register 12 is used for loading the identification information, then several load and read cycles will be required. However, the advantage is that only one general purpose register is used to read the contents of ID registers 13. Alternatively, multiple general purpose registers 12 can be used for reading the information from registers 21 and 22. The number and technique are a design choice, typically of the software program accessing the registers. What is important is that information from the ID registers 13 be loaded into one or more of the general purpose registers 12, so that the software can respond appropriately to the information conveyed. How the software responds to the identification information is also a design choice (of the software programmer). However, the intent is for the software to identify the particular processor and respond appropriately so that the computer will not generate an error nor have a system "crash."

It is to be appreciated that the present invention utilizes registers for the storing of the various identification information. Since all of the information is resident in the registers, no microcode execution is needed, which simplifies the design and enhances performance. Furthermore, the base register 20 contains the essential information required by the software. For additional attributes, the software only need to identify the number of registers allocated to the name and feature registers 21 and 22 which are then accessed for their contents. Flexibility is provided in that the number of registers allocated beyond the base register is arbitrary and is a design choice. Thus, where little information is to be conveyed, only few registers 21 and 22 are needed. Where considerable amount of information is to be conveyed, many registers 21 and 22 could be used.

Furthermore, it is to be noted that the technique of using microcode to sequence through the steps to provide processor identification (as described in the afore-mentioned earlier applications) can be used in conjunction with the present invention if desired. It is preferable to implement the present invention so that microcode need not be used to obtain processor identification. However, in some instances, both techniques can be implemented and made available on a processor. The duality of having both techniques will allow older software currently in use to utilize the microcode technique to identify the processor. Accordingly, such a processor would be compatible with software utilizing either of the techniques.

Thus, a scheme for identifying a microprocessor and its associated attributes is described.

I claim:

1. In a processor which includes a decoder for decoding instructions and a control unit for generating control signals for controlling said processor, an apparatus for providing identification information pertaining to said processor when queried by a processor identification instruction comprising:
   a first register containing a first data field which identifies a higher-level attribute of said processor, said first register also containing a second data field and a third data field, said first register coupled to said control unit;
   at least one second register containing information pertaining to identification of a source of said processor, wherein said second data field contained in said first register identifies a number of said second register or registers present, said second register or registers coupled to said control unit;
   at least one third register containing information which identifies a lower-level attribute of said processor, wherein said third data field contained in said first register identifies a number of said third register or registers present, said third register or registers coupled to said control unit.

2. The apparatus of claim 1 wherein said higher-level attribute identified by said first data field includes information identifying a specific processor architecture type implemented in said processor.

3. The apparatus of claim 2 wherein said higher-level attribute identified by said first data field further includes information identifying a specific model of said processor and specific manufacturing step implemented to fabricate said processor.

4. The apparatus of claim 3 wherein said lower-level attribute identified by said third register or registers includes information identifying a device feature present in said processor.

5. A processor for providing identification information pertaining to itself when queried by a processor identification instruction comprising:
   a control unit for controlling said processor in response to said processor identification instruction;
   a first register containing a first data field which identifies a higher-level attribute of said processor, said first register also containing a second data field and a third data field, said first register coupled to said control unit;
   at least one second register containing information pertaining to identification of a source of said processor, wherein said second data field contained in said first register identifies a number of said second register or registers present, said second register or registers coupled to said control unit;
   at least one third register containing information which identifies a lower-level attribute of said processor, wherein said third data field contained in said first register identifies a number of said third register or registers present, said third register or registers coupled to said control unit.

6. The processor of claim 5 wherein said higher-level attribute identified by said first data field includes information identifying a specific processor architecture type implemented in said processor.

7. The processor of claim 6 wherein said higher-level attribute identified by said first data field further includes information identifying a specific model of said processor and specific manufacturing step implemented to fabricate said processor.

8. The processor of claim 7 wherein said lower-level attribute identified by said third register or registers includes information identifying a device feature present in said processor.

9. A computer system coupled to receive and respond to computer instructions from a program routine comprising:
   a processing unit for receiving, decoding and executing said computer instructions and in which one of said instructions is an identification instruction for identifying a processing characteristic of said computer system;
   a first register containing a first data field which identifies a higher-level attribute of said processing characteristic of said computer system, said first register also containing a second data field and a third data field, said first register coupled to said processing unit;
   at least one second register containing information pertaining to identification of a source of said processing characteristic of said computer system, wherein said second data field contained in said first register identifies a number of said second register or registers present, said second register or registers coupled to said processing unit;
   at least one third register containing information which identifies a lower-level attribute of said processing characteristic of said computer system, wherein said third data field contained in said first register identifies a number of said third register or registers present, said third register or registers coupled to said processing unit
   wherein when said identification instruction is executed, information pertaining to said processing characteristic of said computer system is read.

10. The computer system of claim 9 wherein when said identification instruction is executed, said first register is accessed by said processing unit to read said higher-level attribute and said information identifying said numbers of said second and third registers present.

11. The computer system of claim 10 wherein said higher-level attribute identified by said first data field includes information identifying a specific processing architecture employed in said computer system.

12. The computer system of claim 11 wherein said lower-level attribute identified by said third register or registers includes information identifying a particular processing feature present in said computer system.

13. In a processor which includes a decoder for decoding instructions and a control unit for generating control signals for controlling said processor, a method of providing identification information pertaining to said processor when queried by a processor identification instruction, comprising the steps of:
   having a first data field in a first register to identify a higher-level attribute of said processor;
   having a second data field and a third data field also in said first register;
   having information pertaining to identification of a source of said processor in at least one second register, wherein said second data field of said first register identifies a number of said second register or registers present;

having information which identifies a lower-level attribute of said processor in at least one third register, wherein said third data field of said first register identifies a number of said third register or registers present;

executing said processor identification instruction to access and read said first register;

wherein reading said data fields of said first register identifies said higher-level attribute and numbers of said second and third registers present.

14. The method of claim 13 wherein said higher-level attribute identifies a specific processor architecture type implemented in said processor.

15. The method of claim 14 wherein said higher-level attribute also identifies a specific model of said processor and specific manufacturing step implemented to fabricate said processor.

16. The method of claim 15 wherein said lower-level attribute identifies a device feature present in said processor.

17. In a computer system having a processor as a central processing unit and in which said processor includes a decoder for decoding instructions and a control unit for generating control signals for controlling said processor, a method of providing identification information pertaining to said processor when queried by a processor identification instruction, comprising the steps of:

having a first data field in a first register to identify a higher-level attribute of said processor;

having a second data field and a third data field also in said first register;

having information pertaining to identification of a source of said processor in at least one second register, wherein said second data field of said first register identifies a number of said second register or registers present;

having information which identifies a lower-level attribute of said processor in at least one third register, wherein said third data field of said first register identifies a number of said third register or registers present;

executing said processor identification instruction to access and read said first, second and third data fields in said first register;

wherein reading said data fields of said first register identifies said higher-level attribute and numbers of said second and third registers present.

18. The method of claim 17 wherein said higher-level attribute identifies a specific processor architecture type implemented in said processor.

19. The method of claim 18 wherein said higher-level attribute also identifies a specific model of said processor and specific manufacturing step implemented to fabricate said processor.

20. The method of claim 19 wherein said lower-level attribute identifies a device feature present in said processor.

* * * * *